United States Patent
Nefian et al.

(10) Patent No.: US 7,472,063 B2
(45) Date of Patent: Dec. 30, 2008

(54) AUDIO-VISUAL FEATURE FUSION AND SUPPORT VECTOR MACHINE USEFUL FOR CONTINUOUS SPEECH RECOGNITION

(75) Inventors: Ara V. Nefian, San Jose, CA (US); Xiaobo Pi, Ottawa (CA); Luhong Liang, Beijing (CN); Xiaoxing Liu, Beijing (CN); Yibao Zhao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 924 days.

(21) Appl. No.: 10/326,368

(22) Filed: Dec. 19, 2002

(65) Prior Publication Data

US 2004/0122675 A1   Jun. 24, 2004

(51) Int. Cl.
  *G10L 15/14* (2006.01)
  *G06K 9/70* (2006.01)
(52) U.S. Cl. ............... 704/256.1; 704/236; 382/227
(58) Field of Classification Search ............... None
  See application file for complete search history.

(56) References Cited

U.S. PATENT DOCUMENTS

| | | | |
|---|---|---|---|
| 5,454,043 A | 9/1995 | Freeman | |
| 5,596,362 A | 1/1997 | Zhou | |
| 5,710,590 A | 1/1998 | Ichige et al. | |
| 5,754,695 A | 5/1998 | Kuo et al. | |
| 5,850,470 A * | 12/1998 | Kung et al. | 382/157 |
| 5,887,069 A | 3/1999 | Sakou et al. | |
| 6,024,852 A | 2/2000 | Tamura et al. | |
| 6,072,494 A | 6/2000 | Nguyen | |
| 6,075,895 A | 6/2000 | Qiao et al. | |
| 6,108,005 A | 8/2000 | Starks et al. | |
| 6,128,003 A | 10/2000 | Smith et al. | |
| 6,184,926 B1 | 2/2001 | Khosravi et al. | |
| 6,185,529 B1 | 2/2001 | Chen et al. | |
| 6,191,773 B1 | 2/2001 | Maruno et al. | |
| 6,212,510 B1 | 4/2001 | Brand | |
| 6,215,890 B1 | 4/2001 | Matsuo et al. | |
| 6,219,639 B1 | 4/2001 | Bakis et al. | |
| 6,222,465 B1 | 4/2001 | Kumar et al. | |
| 6,304,674 B1 | 10/2001 | Cass et al. | |

(Continued)

FOREIGN PATENT DOCUMENTS

RU   2112273   8/1995

(Continued)

OTHER PUBLICATIONS

Juergen Luettin, Gerasimos Potamianos, and Chalapathy Neti, "Asynchronous Stream Modelling for Large Vocabulary Audio-Visual Speech Recognition," Proc. 2001 IEEE Int. Conf. on Acoust., Speech, and Sig. Proc. (ICASSP'01), May 7-11, 2001, pp. 169-172.*

(Continued)

*Primary Examiner*—Talivaldis Ivars Smits
(74) *Attorney, Agent, or Firm*—Trop, Pruner & Hu, P.C.

(57) ABSTRACT

A speech recognition method includes several embodiments describing application of support vector machine analysis to a mouth region. Lip position can be accurately determined and used in conjunction with synchronous or asynchronous audio data to enhance speech recognition probabilities.

20 Claims, 4 Drawing Sheets

U.S. PATENT DOCUMENTS

| | | | |
|---|---|---|---|
| 6,335,977 | B1 | 1/2002 | Kage |
| 6,385,331 | B2 | 5/2002 | Harakawa et al. |
| 6,594,629 | B1 | 7/2003 | Basu et al. |
| 6,609,093 | B1 | 8/2003 | Gopinath et al. |
| 6,624,833 | B1 | 9/2003 | Kumar et al. |
| 6,633,844 | B1 | 10/2003 | Verma et al. |
| 6,678,415 | B1 | 1/2004 | Popat et al. |
| 6,751,354 | B2 | 6/2004 | Foote et al. |
| 6,816,836 | B2 | 11/2004 | Basu et al. |
| 6,952,687 | B2 | 10/2005 | Andersen et al. |
| 6,996,549 | B2 * | 2/2006 | Zhang et al. .................. 706/16 |
| 2002/0031262 | A1 * | 3/2002 | Imagawa et al. ............ 382/190 |
| 2002/0036617 | A1 | 3/2002 | Pryor |
| 2002/0093666 | A1 | 7/2002 | Foote et al. |
| 2002/0102010 | A1 | 8/2002 | Liu et al. |
| 2002/0135618 | A1 | 9/2002 | Maes et al. |
| 2002/0140718 | A1 | 10/2002 | Yan et al. |
| 2002/0161582 | A1 | 10/2002 | Basson et al. |
| 2003/0110038 | A1 * | 6/2003 | Sharma et al. .............. 704/270 |
| 2003/0123754 | A1 | 7/2003 | Toyama |
| 2003/0144844 | A1 | 7/2003 | Colmenarez et al. |
| 2003/0154084 | A1 | 8/2003 | Li et al. |
| 2003/0171932 | A1 | 9/2003 | Juang et al. |
| 2003/0190076 | A1 | 10/2003 | DeLean |
| 2003/0212552 | A1 | 11/2003 | Liang |

FOREIGN PATENT DOCUMENTS

| | | |
|---|---|---|
| RU | 2093890 | 10/1997 |
| WO | WO 00/36845 | 6/2000 |
| WO | WO 03/009218 A1 | 1/2003 |

OTHER PUBLICATIONS

Mihaela Gordan, Constantine Kotropoulos, and Ioannis Pitas, "A Temporal Network fo Support Vector Machine Classifiers for the Recognition of Visual Speech," Meth. and Appl. of Artificial Intelligence: Proc. 2nd Hellenic Conf. on AI (SETN 2002), Thessaloniki, Greece, Apr. 11-12, 2002, p. 355-365.*

Ming-Hsuan Yang, david J. Kriegman,a dn Narendra Ahuja, "Detecting Faces in Images: A Survey," IEEE trans Pattern Analysis and Machine Intelligence, vol. 24, No. 1, Jan. 2002, pp. 34-58.*

Yongmin Li, Shaogang gong, Jamie sherrah, and Heather Liddell, "Multi-view face Detection Using Support Vector Machines and Eigenspace Modelling," Proc. Int. Conf. on Knowledge-based Intelligent Engineering Systems and Allied Technologies, Brighton UK, Sep. 2000, pp. 241-244.*

Pankaj Batra, "Modeling and Efficient Optimization for Object-Based Scalability and Some related Problems," IEEE Trans. Image Proc., vol. 9, No. 10, Oct. 2000, pp. 1677-1692.*

Hennecke, et al: Automatic Speech Recognition System Using Acoustic and Visual Signals, IEEE, 1996.

Dupont et al: Audio-Visual Speech Modeling for Continuous Speech Recognition, Sep. 2000, IEEE Transactions on Multimedia, vol. 2, No. 3, pp. 141-151.

Potamianos et al: An Image Transform Approach for HMM Based Automatic Lipreading, Proc. Int. conf. Image Processing, 1998.

Potamianos et al: Linear Discriminant Analysis for Speechreading; IEEE Workshop on Multimedia Processing, Dec. 1998.

Chan. HMM-Based Audio-Visual Speech Recognition Integrating Geometric and Appearance-Based Visual Features, IEEE 2001.

Pavlovic: Dynamic Bayesian Networks for Information Fusion with Applications to Human-Computer Interfaces; Thesis, University of Urbana-Champaign, 1999, pp. iii-ix and 63-81.

Rezek, et al: Coupled Hidden Markov Models for Biosignal Interaction; Advances in Medical Signal and Information Processing, Sep. 4-6, 2000; pp. 54-59.

Fu, et al: Audio-Visual Speaker Identification Using Coupled Hidden Markov Models; 2003 Int'l Conference on Image Processing (ICIP), Sep. 14-17, 2003; vol. 2, pp. 29-32.

Nefian, et al: A Coupled HMM for Audio-Visual Speech Recognition; Proceeding IEEE Int'l Conference on Acousitics, Speech, and Signal Processing, vol. 3 of 4, May 13-17, 2002, pp. 2013-2016.

Kristjansson, et al: Event-Coupled Hidden Markov Models; 2000 IEEE Int'l Conference on Multimedia and Expo, Jul 30-Aug. 2, 2000; vol. 1; pp. 385-388.

Pavlovic: Multimodal Tracking and Classification of Audio-Visual Features; 1998 Int'l Conference on Image Processing, ICIP Proceedings; Oct. 4-7, 1998, vol. 1; pp. 343-347.

Wikipedia, definition of Hidden Markov Model, 3 pages.

Wikipedia, definition of Viterbi Algorithm, 5 pages.

Rezek, et al: Learning Interaction Dynamics with Coupled Hidden Markov Models; IEEE Proceedings—Science, Measurement and Technology, Nov. 2000; vol. 147, Issue 6; pp. 345-350.

Logan et al: Factorial Hidden Markov Models for Speech Recognition: Preliminary Experiments; Cambridge Research Laboratory; Technical report Series; CRL 97/7; Sep. 1997.

Dugad: Tutorial on Hidden Markov Models; Technical Report No.: SPANN-96, May 1996, pp. 1-16.

Brand: Coupled Hidden Markov Models for Modeling Interacting Processes; Learning and Common Sense Technical Report 405, Jun. 3, 1997, MIT Media Lab Perceptual Computing, USA, pp. 1-28.

Nefian et al: An Embedded HMM-Based Approach for Face Detection and Recognition; Proceedings of the IEEE Int'l Conference on Acousincs, Speech and Signal Processing, Mar. 15-19, 1999; IEEE, Mar. 15, 1999, pp. 3553-3556, USA.

Nefian: Embedded Bayesian Networks for Face Recognition; IEEE In'tl Conference on Multimedia and Expo; IEEE vol. 2, Aug. 26, 2002, pp. 133-136.

Kennedy, et al: Identification of Coupled Markov Chain Model with Application; Proceedings of the 31st IEEE Conference on Decision and Control, Dec. 16-18, 1992; vol. 4, pp. 3529-3534.

Ramesh, et al: Automatic Selection of Tuning Parameters for Feature Extraction Sequences; Proceedings IEEE Computer Society Conference on Computer vision and Pattern Recognition; Jun. 21-23, 1994, pp. 672-677.

Liang, et al: Speaker Independent Audio-Visual Continuous Speech Recognition; Aug. 2002; Multimedia and Expo, vol. 2, pp. 25-28; IEEE.

Int'l Application No.: PCT/US03/31454 Written Opinion dated Oct. 12, 2006.

Pending U.S. Appl. No. 10/143,459, filed May 9, 2002, inventor: Liang Office Action dated Oct. 31, 2006.

Wikipedia definition: Linear Discriminant Analysis.

Neti et al.:: Large-Vocabulary Audio-Visual Speech Recognition: A Summary of the Johns Hopkins Summer 2000 Workshop IEEE 2001 pp. 619-624.

Wikipedia, definition of Viterbi Algorithm, 5 pages, Feb. 8, 2006.

Wikipedia, definition of Hidden Markov Model, 3 pages, Feb. 11, 2006.

U.S. Appl. No. 10/142,468 filed May 9, 2002 Office Action dated Mar. 1, 2006.

U.S. Appl. No. 10/142,468 filed May 9, 2002 Office Action dated Aug. 2, 2005.

U.S. Appl. No. 10/269,333 filed Oct. 11, 2002 Office Action dated Jan. 20, 2006.

U.S. Appl. No. 10/269,381 filed Jan. 6, 2003 Office Action dated OA Mar. 3, 2006.

PCT/US 03/31454 Int'l Search Report dated Mar. 1, 2004.

Wikipedia: Definition of Linear Discriminant Analysis, Aug. 29, 2006.

U.S. Appl. No. 10/143,459 filed May 9, 2002 Office Action dated May 23, 2006.

U.S. Appl. No. 10/269,333 filed Oct. 11, 2002 Final Office Action dated May 16, 2006.

U.S. Appl. No. 10/142,447 filed May 9, 2002 Office Action dated May 17, 2006.

U.S. Patent and Trademark Office Official Action in related U.S. Appl. No. 10/269,381 dated Mar. 3, 2006, with corresponding Reply to Official Action filed Jun. 5, 2006.

U.S. Patent and Trademark Office Official Final Action in related U.S. Appl. No. 10/269,381 dated Jul. 1, 2006, with corresponding Request for Continued Examination and Response filed Oct. 11, 2006.

U.S. Patent and Trademark Office Official Action in related U.S. Appl. No. 10/142,447 dated Jul. 8, 2005, with corresponding Amendment and Response to Official Action filed Oct. 10, 2005.

U.S. Patent and Trademark Office Official Final Action in related U.S. Appl. No. 10/142,447 dated Jan. 20, 2006, with corresponding Request for Continued Examination and Preliminary Amendment filed Apr. 20, 2006.

U.S. Patent and Trademark Office Official Action in related U.S. Appl. No. 10/142,447 dated May 17, 2006, with corresponding Amendment and Response to Official Action filed Aug. 14, 2006.

U.S. Patent and Trademark Office Official Action in related U.S. Appl. No. 10/269,333 dated Jan. 20, 2006, with corresponding Amendment and Response to Official Action filed Apr. 20, 2006.

U.S. Patent and Trademark Office Official Final Action in related U.S. Appl. No. 10/269,333 dated May 16, 2006, with corresponding After Final Amendment filed Jul. 28, 2006.

* cited by examiner

AUDIO-VISUAL FEATURE FUSION AND SUPPORT VECTOR MACHINE USEFUL FOR CONTINUOUS SPEECH RECOGNITION

FIELD OF THE INVENTION

The present invention relates to image processing, including face detection or audiovisual recognition systems.

BACKGROUND

Reliable identification and analysis of facial features is important for a wide range of applications, including security applications and visual tracking of individuals. Facial analysis can include facial feature extraction, representation, and expression recognition, and available systems are currently capable of discriminating among different facial expressions, including lip and mouth position. Unfortunately, many systems require substantial manual input for best results, especially when low quality video systems are the primary data source.

In recent years, it has been shown that the use of even low quality facial visual information together with audio information significantly improve the performance of speech recognition in environments affected by acoustic noise. Conventional audio only recognition systems are adversely impacted by environmental noise, often requiring acoustically isolated rooms and consistent microphone positioning to reach even minimally acceptable error rates in common speech recognition tasks. The success of the currently available speech recognition systems is accordingly restricted to relatively controlled environments and well defined applications such as dictation or small to medium vocabulary voice-based control commands (hand free dialing, menu navigation, GUI screen control). These limitations have prevented the widespread acceptance of speech recognition systems in acoustically uncontrolled workplace or public sites.

The use of visual features in conjunction with audio signals takes advantage of the bimodality of the speech (audio is correlated with lip position) and the fact that visual features are unaffected by acoustic noise. Various approaches to recovering and fusing audio and visual data in audiovisual speech recognition (AVSR) systems are known. One popular approach relies on mouth shape as a key visual data input. Unfortunately, accurate detection of lip contours is often very challenging in conditions of varying illumination or during facial rotations. Alternatively, computationally intensive approaches based on gray scale lip contours modeled through principal component analysis, linear discriminant analysis, two-dimensional DCT, and maximum likelihood transform have been employed to recover suitable visual data for processing.

DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION

Figure 1:
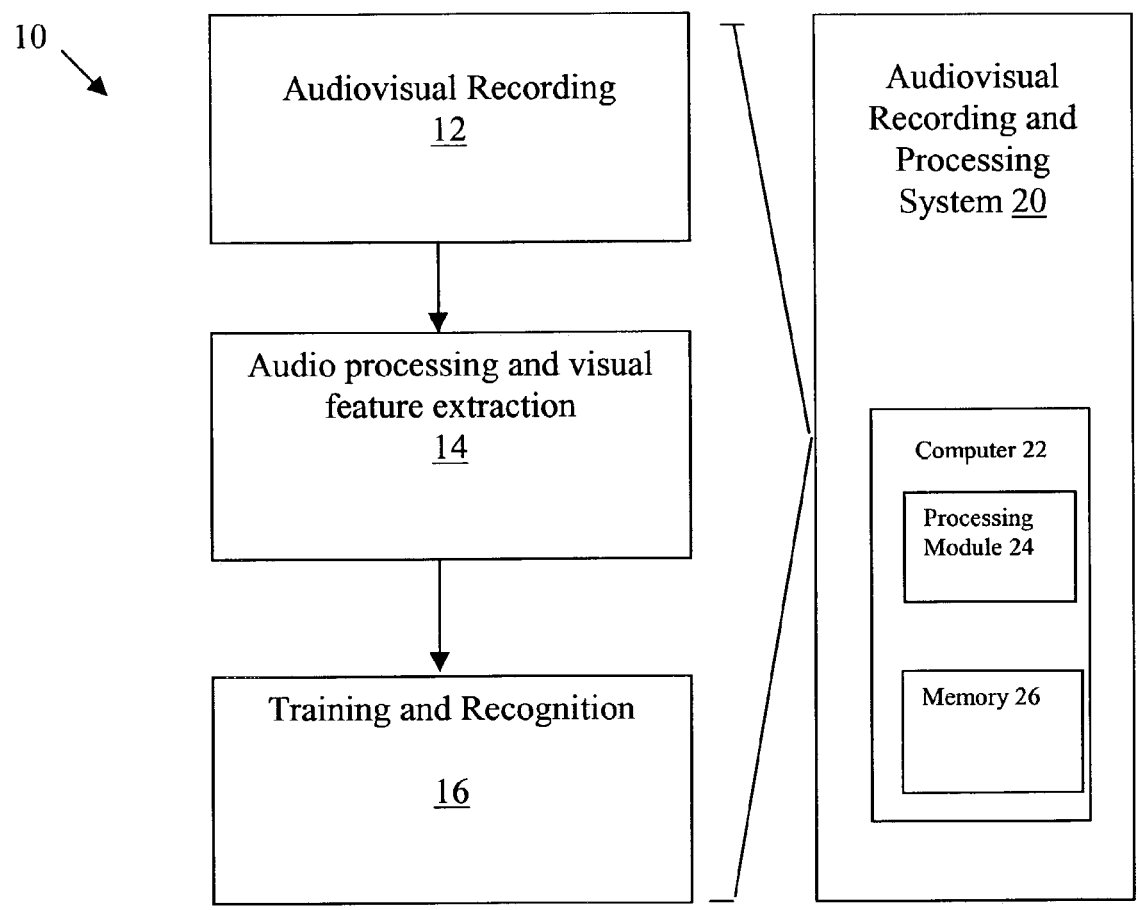
FIG. 1 generically illustrates a procedure for audiovisual speech recognition.

As seen with respect to the block diagram of FIG. 1, one possible embodiment of a process 10 for audiovisual speech recognition system and processing of audiovisual information can be implemented on a computer based audiovisual recording and processing system 20. The system 20 includes one or more linked computers 22 having linked processors 24 and shared or separate memory 26. As will be appreciated, computers 22 includes, but are not limited or restricted to a computer (e.g., desktop, a laptop, a server, blade server, a workstation, a personal digital assistant, etc.) or any peripherals associated therewith; communication equipment (e.g., telephone handset, pager, etc.); or dedicated audiovisual processing unit supported by embedded processors and the like. A "link" is broadly defined as a logical or physical communication path such as, for instance, electrical wire, optical fiber, cable, bus trace, or even a wireless channel using infrared, radio frequency (RF), or any other wireless signaling mechanism. In addition, the term "information" is defined as one or more bits of data, address, and/or control. "Code" includes software or firmware that, when executed, performs certain functions. Examples of code include an application, an applet, or any other series of instructions to processor 24.

System 20 provides separate or integrated camera and audio systems for audiovisual recording 12 of both facial features and speech of one or more speakers, in real-time or as a recording for later audiovisual information processing. Audiovisual information can be recorded and stored in an analog format, or preferentially, can be converted to a suitable digital form, including but not limited to MPEG-2, MPEG-4, JPEG, Motion JPEG, or other sequentially presentable transform coded images commonly used for digital image storage. Low cost, low resolution CCD or CMOS based video camera systems can be used, although video cameras supporting higher frame rates and resolution may be useful for certain applications. Audio data can be acquired by low cost microphone systems, and can be subjected to various audio processing techniques to remove intermittent burst noise, environmental noise, static, sounds recorded outside the normal speech frequency range, or any other non-speech data signal.

In operation, the captured (stored or real-time) audiovisual data is subjected to audio processing and visual feature extraction 14. A training and recognition module 18 is used to yield a desired text data stream reflecting the captured speech, after a suitable training procedure. As will be understood, data streams can be processed in near real-time on sufficiently powerful computing systems, processed after a delay or in batch mode, processed on multiple computer systems or parallel processing computers, or processed using any other suitable mechanism available for digital signal processing.

Software implementing suitable procedures, systems and methods can be stored in the memory of a computer system as a set of instructions to be executed. In addition, the instructions to perform procedures described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version. Alternatively, the logic could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

Figure 2:
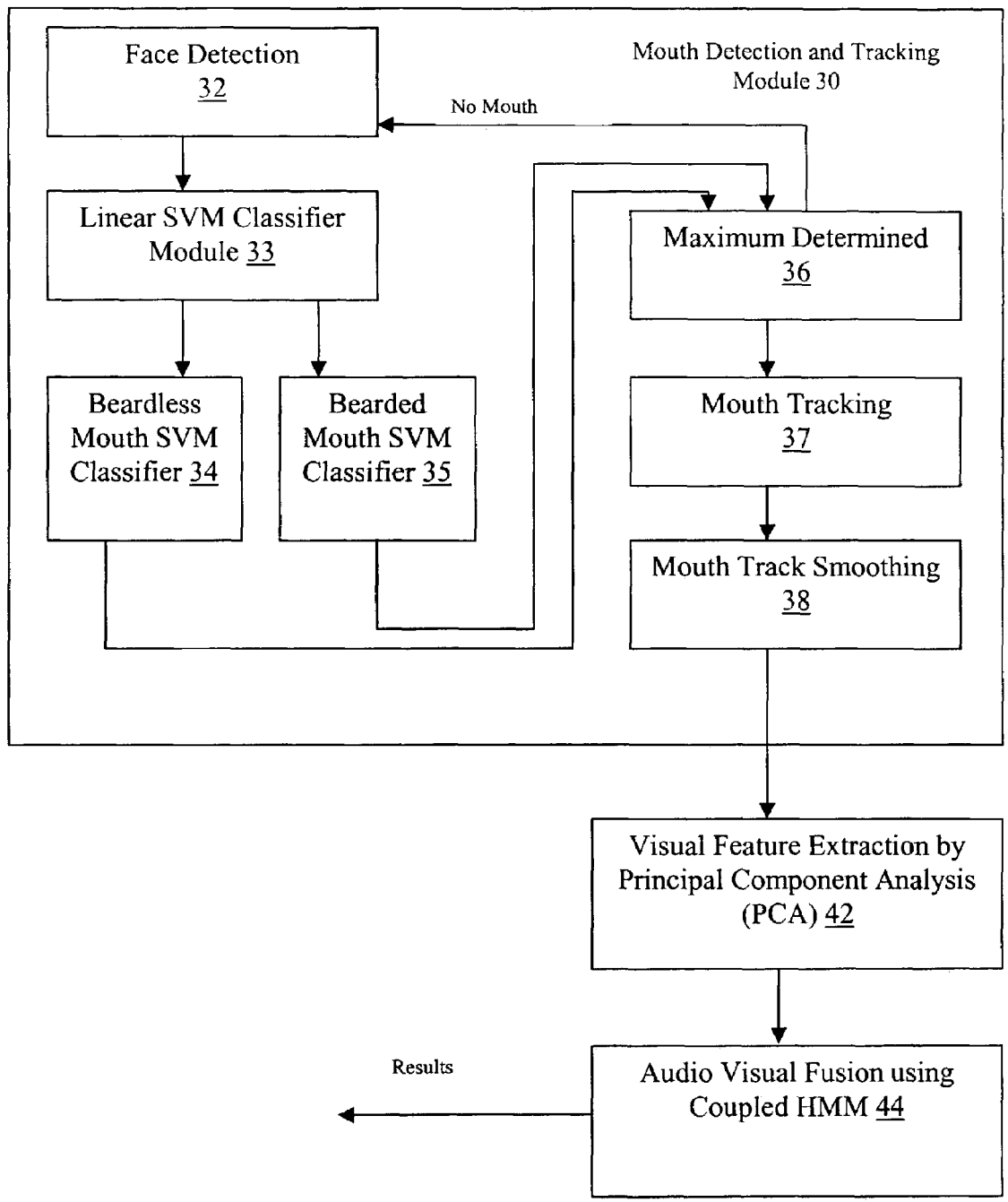
FIG. 2 illustrates a procedure for visual feature extraction from a mouth region and post-extraction processing.

One embodiment of a suitable visual feature extraction procedure suitable for training and recognition is illustrated with respect to FIG. 2. As seen in that Figure, mouth detection and tracking module 30 includes face detection 32 of the speaker's face in a video sequence. The mouth detection and tracking system also includes a Linear SVM Classifier Module 33, a mouth classifier 34, mouth/beard classifier 35, a maximum matching score selection module a maximum matching score selection module 36, mouth tracker 37, and mouth tracker smoothing module 38.

Various face detecting procedures or algorithms are suitable face detection 32, including pattern matching, shape correlation, optical flow based techniques, or hierarchical segmentation. In one particular embodiment, a suitable face detection procedure requires use of a Gaussian mixture model to model the color distribution of the face region. The generated color distinguished face template, along with a background region logarithmic search to deform the template and fit it with the face optimally based on a predetermined target function, can be used to identify single or multiple faces in a visual scene. In another preferred embodiment, neural network based techniques are used for face detection.

After the face is detected, mouth region discrimination is required, since other areas of the face generally have low or minimal correlation with speech. Since the search area for the mouth is significantly reduced by the results of the face detector, a cascade of support vector machine (SVM) classifiers 33 can be used to locate the mouth within the lower region of the face. The SVM cascade (using two or more standard SVM classifiers) is computationally efficient, and facilitates accurate real time system operation of mouth recognition. Typically, first SVM classifier finds the coarse region of the mouth. The size of the sub-images used in training this classifier for this stage is 16×16. This sub image is obtained through down sampling of the mouth training set. Most of the non-mouth regions are therefore removed by this classifier, but also several "false alarms" are passed as true positions of the mouth. The role of the second SVM classifier (trained on mouth regions of size 32×32) is to look at the regions classified as mouth by the first SVM and further remove all the false alarms. Generally, the first SVM classifier is faster and the second one is more precise.

To adapt to scale variations, a multi-scale search in an estimated range is implemented, with repeated resampling of a source image by a constant factor. A preprocessing step normalizes source images with respect to variations in illumination via histogram equalization and gradient illumination correction. Next, a SVM filter of size 16×14 with linear kernel can be applied to the lower region of the face to determine the coarse location of the mouth. Finally, two SVM classifiers with Gaussian kernel of size 32×28, trained on examples of mouth regions with and without facial hair, are applied to each test pattern and its rotated versions in the image plane. The highest mouth classification score among all rotated patterns and SVM classifiers is used to determine the refined location of the mouth. The positive examples used for the training of the SVM filters consist of a set of manually labeled mouth images and a set of negative examples (facial regions other than the mouth). Using the labeled points in the positive set, including the corners, the upper and lower points, and the center of the mouth, the size of the training set is enhanced with several geometric variations such as scaling, horizontal mirroring and rotations in the image plane. Then, a pre-processing step consisting of scale normalization, histogram equalization and illumination correction is applied to both the positive and the negative examples in the training set. The Gaussian kernel SVM filters are trained via bootstrapping as follows:

1. train the SVM filters using the positive and negative training sets,
2. run the SVM filters on a validation set and enhance both the positive set with undetected mouth regions and the negative set with false alarms,
3. repeat step 1-2 until the mouth detector reaches the desired performance.

In one experiment, the training sets obtained after the bootstrapping procedure consist of approximately 8000 non-mouth, 9000 mouth and 6000 mouth-and-beard samples respectively. The mouth samples were obtained by mirroring, rotating, and rescaling of respectively 250 and 800 images of users with beards and without beards.

Following the detection of the face and mouth region, and classification by the SVM module and mouth or mouth/beard classifiers 34 and 35 the mouth position is tracked by mouth tracking module 37 over consecutive frames. The center of the mouth is estimated from the previous frame, and the mouth detection algorithm is applied to a reduced area around the estimated center of the mouth. If all the test patterns in the search area fail to be assigned to the mouth region, the system re-initializes with the face and mouth detection algorithm, or the new mouth center is estimated and the mouth tracking continues. The mouth track is further smoothed using a mouth smoothing module 38. A median filter followed by a Gaussian filter can be used by module 38. The approach was tested on a database representing 190 sequences recorded from 95 speakers. The overall accuracy of the mouth detection and tracking system is 95.26%, with 86.67% for the 30 sequences of people wearing beards and 96.88% for the remaining sequences.

After successful operation of mouth tracking module 30, the visual features of the mouth are extracted for processing by a software or hardware module for visual feature extraction by Principal Component Analysis (PCA) 42. In one embodiment, a set of visual observation vectors are extracted from a 64×64 region centered on the mouth using a cascade algorithm. In operation, the gray level pixels in the mouth region are mapped to a 32 dimensional feature space using principal component analysis (PCA). The PCA decomposition is computed from a set of approximately 200,000 mouth region images obtained from the mouth tracking system 30. The resulting vector of size 32 is upsampled to match the frequency of audio features (normally about 100 Hz) and standardized using feature mean normalization or other conventional technique. Next, blocks of N visual observation vectors are concatenated and projected on a 13 class linear discriminant space to obtain a new set of visual observation vectors of size 13. The class information used in linear discriminant analysis corresponds to 13 English visemes (common mouth positions used by English speakers, visual analogs of acoustical phonemes). These visemes are modeled by hidden Markov models with 3 states, 12 Gaussian components per state and diagonal covariance matrix.

After face detection, mouth tracking, video and acoustic processing, and upsampling of data to audio date rates, the generated video data must be fused with audio data using a suitable fusion model. In one embodiment, a software or hardware module 44 for audiovisual fusion (integration) using a coupled hidden Markov model (HMM) is useful. Operation and training of such dynamic Bayesian networks in general and of the coupled HMMs in particular, is a well understood. Any discrete time and space dynamical system governed by a hidden Markov chain emits a sequence of observable outputs with one output (observation) for each state in a trajectory of such states. From the observable sequence of outputs, the most likely dynamical system (in this case, recognized speech data output in response to collected and processed audiovisual data) can be calculated.

Figure 3:
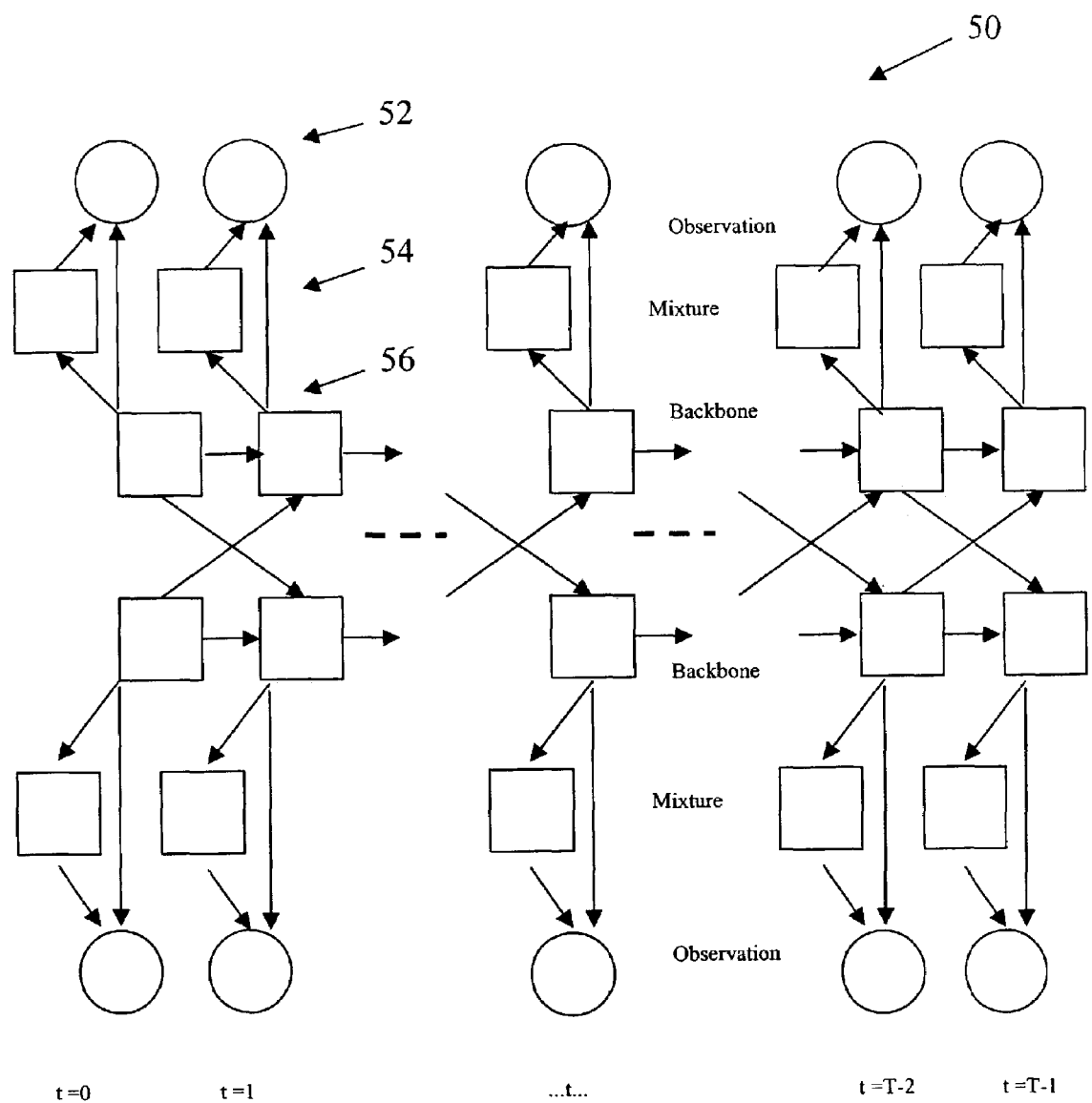
FIG. 3 schematically illustrates an audiovisual coupled HMM.

The coupled HMM is a generalization of the HMM suitable for a large scale of multimedia applications that integrate two or more streams of data. A coupled HMM can be seen as a collection of HMMs, one for each data stream, where the discrete nodes at time t for each HMM are conditioned by the discrete nodes at time $t_1$ of all the related HMMs. Diagram 50 in FIG. 3 illustrates a continuous mixture two-stream coupled HMM that can be used in an audiovisual speech recognition system. The squares represent the hidden discrete nodes (nodes 54 and 56) while the circles describe the continuously observable nodes 52. The hidden discrete nodes can be respectively conditioned temporally as coupled backbone nodes 56 and mixture nodes 54.

The audio and video observation likelihoods are computed independently, significantly reducing the parameter space and overall complexity of the Markov model. Viseme/phoneme pairs are modeled, and in certain embodiments, audio and visual probabilities can be modified to adjust for differing associated noise levels.

Training of the coupled Hidden Markov model starts with a Viterbi based initialization, followed by application of an expectation-maximization EM) algorithm.

Continuous speech recognition is provided by a conventional single pass Viterbi beam search. A Viterbi beam search is a recursive algorithm that performs an optimal exhaustive search. For hidden Markov model based speech recognition, the Viterbi algorithm is used to find the most probable path through a probabilistically scored time/state lattice. Beam search provides pruning and data organization techniques to reduce the effective size of the search space. The pruning beam width is defined relative to the most probable hypothesis log likelihood at frame t. Hypotheses outside the beam (those with log likelihoods less than some predefined probability) are pruned from the search.

Figure 4:
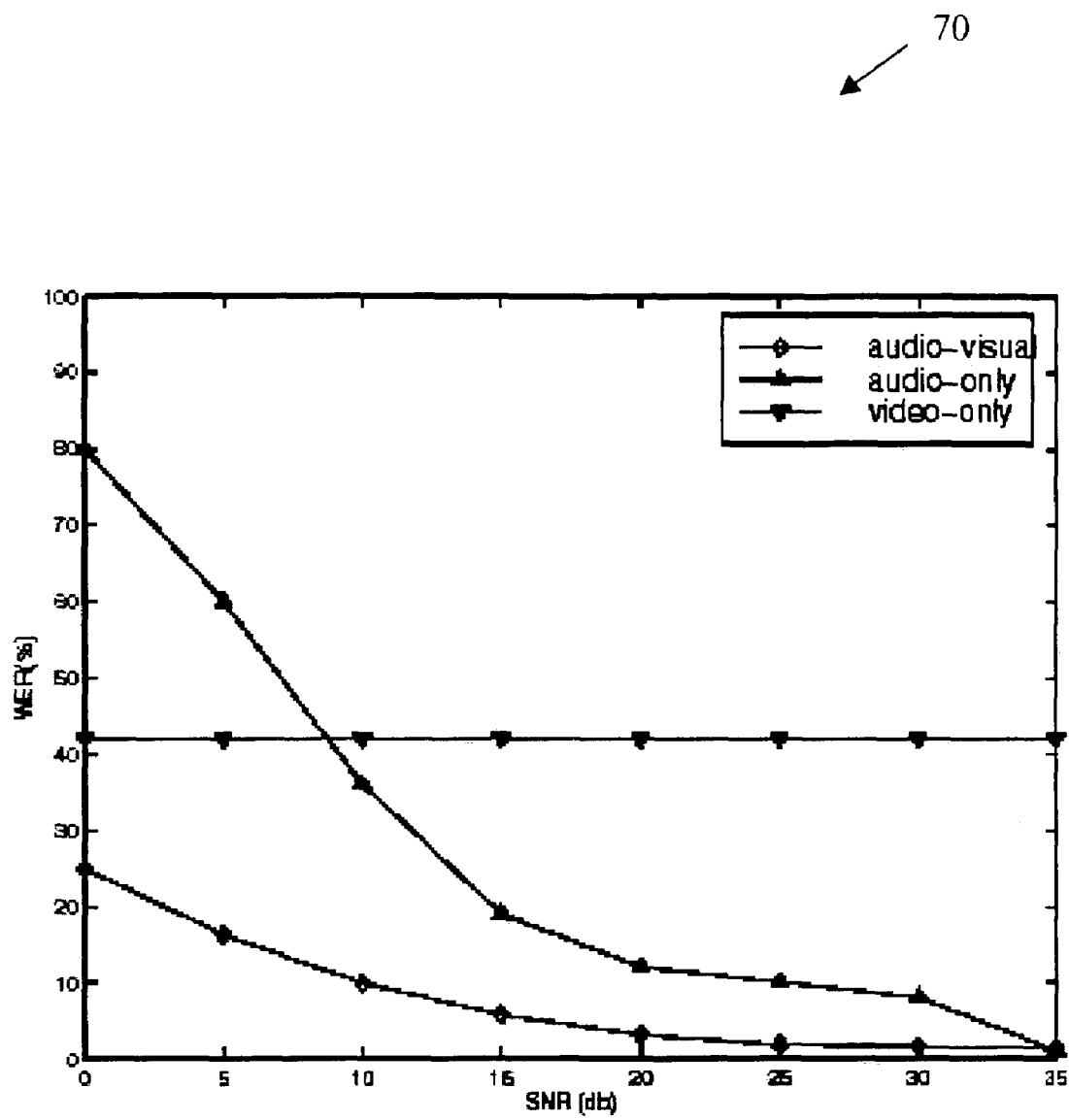
FIG. 4 illustrates recognition rate using a coupled HMM model.

Experimental results for speaker dependent audiovisual word recognition system on words in a database have been determined. The average audio-only, video-only and audio-visual word error rates are presented graphically in chart 70 of FIG. 4. In chart 70, the inverted triangle data point represents error when using a visual HMM alone, the triangle data point represents an audio HMM alone, and the diamond shaped data point illustrates error rates using an audiovisual coupled HMM. The acoustic observation vectors consist of 13 MFCC coefficients extracted from a 20 ms window, and overlap of 15 ms. For audio-video recognition, a coupled hidden Markov model with three states per nod in both audio and video streams, with no back transitions, with 32 mixtures per state, and diagonal covariance matrix is used. The experimental results indicate that the coupled HMM-based audiovisual speech recognition rate increases by 55% over the audio-only speech recognition at SNR of 0 db.

As will be appreciated, accurate audiovisual data to text processing can be used to enable various applications, including provision of robust framework for systems involving human computer interaction and robotics. Accurate speech recognition in high noise environments allows continuous speech recognition under uncontrolled environments, speech command and control devices such as hand free telephones, and other mobile devices. In addition the coupled HMM can be applied to a large number of multimedia applications that involve two or more related data streams such as speech, one or two hand gesture and facial expressions. In contrast to a conventional HMM, the coupled HMM can be readily configured to take advantage of the parallel computing, with separate modeling/training data streams under control of separate processors.

As will be understood, reference in this specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims, including any amendments thereto, that define the scope of the invention.

What is claimed is:

1. A method for recognizing speech by fusing audio and visual features, comprising
   generating an audio vector representing detected audio data of a speech utterance,
   detecting a face in a video data stream linked to the audio data of the speech utterance,
   applying a cascade of linear support vector machine classifiers to the detected face to locate a mouth region,
   generating vector data for the mouth region,
   training a hidden Markov model (HMM) by fusing audio and visual vector data with the HMM, and
   recognizing an input speech by extracting audio and visual features and by comparing the extracted audio and visual features with HMMs obtained at least in part through audio and visual fusion.

2. The method of claim 1, wherein the linear support vector machine classifiers are trained using positive and negative training sets.

3. The method of claim 1, further comprising use of a mouth and beard classifier.

4. The method of claim 1, wherein a cascade algorithm operates on a multidimensional mouth feature space obtained through principal component analysis decomposition.

5. The method of claim 1, further comprising mirroring, rotating, rescaling, and normalizing the mouth region.

6. The method of claim 1, further comprising applying a smoothing filter to the mouth region.

7. The method of claim 1, further comprising fusing audio and visual vector data using a two stream coupled hidden Markov model.

8. The method of claim 1, further comprising using asynchronous audio and video data.

9. The method of claim 1, further comprising applying a graph decoder and a Viterbi beam search.

10. The method of claim 1, further comprising modifying audio and video probabilities as a function of noise.

11. An article comprising a computer readable medium to store computer executable instructions, the instructions defined to cause a computer to recognize speech by fusing audio and visual features via operations including:

- generating an audio vector representing detected audio data of a speech utterance,
- detecting a face in a video data stream linked to the audio data of the speech utterance,
- applying a cascade of linear support vector machine classifiers to the detected face to locate a mouth region,
- generating vector data for the mouth region,
- training a hidden Markov model (HMM) by fusing audio and visual vector data with the HMM, and
- recognizing an input speech by extracting audio and visual features and by comparing the extracted audio and visual features with HMMs obtained at least in part through audio and visual fusion.

12. The article of claim 11, wherein the linear support vector machine classifiers are trained using positive and negative training sets.

13. The article of claim 11, wherein the operations further comprise use of a mouth and beard classifier.

14. The article of claim 11, wherein a cascade algorithm operates on a multidimensional mouth feature space obtained through principal component analysis decomposition.

15. The article of claim 11, wherein the operations further comprise mirroring, rotating, rescaling, and normalizing the mouth region.

16. The article of claim 11, wherein the operations further comprise applying a smoothing filter to the mouth region.

17. The article of claim 11, wherein the operations further comprise fusing audio and visual vector data using a two stream coupled hidden Markov model.

18. The article of claim 11, wherein the operations further comprise using asynchronous audio and video data.

19. The article of claim 11, wherein the operations further comprise applying a graph decoder and a Viterbi beam search.

20. The article of claim 11, wherein the operations further comprise modifying audio and video probabilities as a function of noise.

* * * * *